United States Patent [19]

Satoh

[11] 4,244,009
[45] Jan. 6, 1981

[54] CUE RECORDING SYSTEM FOR MAGNETIC RECORDER

[75] Inventor: Ken Satoh, Hachioji, Japan

[73] Assignee: Olympus Optical Co., Ltd., Tokyo, Japan

[21] Appl. No.: 911,935

[22] Filed: Jun. 2, 1978

Related U.S. Application Data

[62] Division of Ser. No. 774,697, Mar. 4, 1977, abandoned.

[30] Foreign Application Priority Data

Mar. 10, 1976 [JP] Japan .................. 51/26413
Mar. 10, 1976 [JP] Japan .................. 51/26414

[51] Int. Cl.³ .................................................. G11B 19/02
[52] U.S. Cl. ..................................... 360/71; 360/68
[58] Field of Search ............. 360/72, 74, 137, 71, 360/61–63, 72.1, 74.1, 68

[56] References Cited

U.S. PATENT DOCUMENTS

| | | | |
|---|---|---|---|
| 3,109,898 | 11/1963 | Gray | 360/72 |
| 3,852,814 | 12/1974 | Johnson | 370/72 |
| 3,896,489 | 7/1975 | Rudert | 360/72 |
| 4,041,249 | 8/1977 | Matz | 360/72 |

Primary Examiner—John H. Wolff
Attorney, Agent, or Firm—Ostrolenk, Faber, Gerb & Soffen

[57] ABSTRACT

A cue recording system for magnetic recorders responds to the closure of a pushbutton switch which is operated when a cue signal is to be recorded, by activating a duration decision circuit which maintains a cue generator in operation during a time duration determined by the decision circuit for magnetic recording thereof, independently from the length of time during which the pushbutton switch is held closed. With a magnetic recorder in which an acoustic signal to be recorded and a cue signal is recorded on one track of the magnetic tape, in serial fashion a short-circuiting or AGC transistor is rendered conductive as the cue generator is turned on, thereby short-circuiting or attenuating a record input from an associated microphone.

4 Claims, 4 Drawing Figures

4,244,009

CUE RECORDING SYSTEM FOR MAGNETIC RECORDER

RELATED APPLICATIONS

This is a divisional of U.S. patent application Ser. No. 774,697, filed Mar. 4, 1977, now abandoned.

BACKGROUND OF THE INVENTION

The invention relates to a cue recording system for magnetic recorders, and more particularly to a cue recording system which records a cue signal in a magnetic recorder such as a conventional tape recorder, dictating machine or the like.

When a magnetic tape, on which an acoustic signal is recorded by a magnetic recorder such as a dictating machine or tape recorder, is loaded on a playback unit such as a transcriber, for purpose of reproducing the recorded acoustic signal, a cue signal is usually employed to provide an indication of a tape portion where a desired message is recorded. The cue signal is magnetically recorded on the tape by an operator of the magnetic recorder so as to be detected during its playback operation. Usually a cue signal is recorded on a tape at a location corresponding to the beginning of a message which is desired to be typewritten or where a particular care should be exercised in hearing, as distinguished from the remainder of the recorded signal. During playback, the tape is played under a rapid advance mode until the cue signal is detected, whereupon the tape is automatically fed at a lower uniform rate for reproducing the recorded signal portion of interest.

The cue signal recorded is detected by a cue detecting head, and since the tape is in its rapid advance mode during the detection of the cue signal, it is necessary that the cue signal be recorded over a certain tape length or over a given period of time. The usual practice of magnetically recording a cue signal on the tape is to depress a pushbutton to close an associated switch, which activates a cue generator for feeding it to a cue recording head, which in turn magnetically records it on the tape. When such scheme is followed, it will be understood that the duration of the recorded cue signal depends on the length of time during which the pushbutton is held depressed, thus failing to provide a recorded cue signal of a given time interval. Specifically, if the pushbutton is immediately released, the cue signal recorded will be of an insufficient duration to permit its detection upon playback, thus causing a failure to locate the intended signal portion. On the other hand, if the pushbutton is held depressed for an increased time period, the cue signal will have an increased duration, causing a waste of the activating current and reducing a tape length which is available for the recording of the acoustic signal.

With a magnetic recorder in which an acoustic signal from a microphone and a control or cue signal are serially recorded on one track of a magnetic tape through a single magnetic head, it is possible for the acoustic input signal to be simultaneously recorded as the cue signal is being recorded. In such circumstances, there again results a failure of locating the intended signal portion during the playback of the tape.

SUMMARY OF THE INVENTION

It is an object of the invention to eliminate the above mentioned disadvantages of a conventional cue recording system, by providing a cue recording system for magnetic recorder in which a cue signal of a given duration is produced and recorded on a tape in response to the closure of a pushbutton switch which is provided for purpose of recording a cue signal.

It is another object of the invention to provide a cue recording system for magnetic recorders of the type in which an acoustic signal from a microphone and a control or cue signal are serially recorded on track of a magnetic tape, wherein a concurrent recording of the both signals is avoided.

In accordance with the invention, there is provided a duration decision circuit which operates for a given time interval in response to the closure of pushbutton switch which is provided for the purpose of recording a cue signal. This ensures that a cue generator operates for a given time duration independently from the length of time during which the pushbutton switch is held closed so that a cue signal of a given duration, for example, one second, is produced for magnetic recording.

In accordance with another aspect of the invention, where an acoustic signal from a microphone and a cue signal from a cue generator are serially recorded on one track of the magnetic tape, means is provided which prevents the application of an acoustic signal from the microphone to a recording circuit during the time interval in which the cue signal is being recorded, whereby a concurrent recording of the both signals is avoided.

DETAILED DESCRIPTION OF PREFERRED EMBODIMENTS

Figure 1:
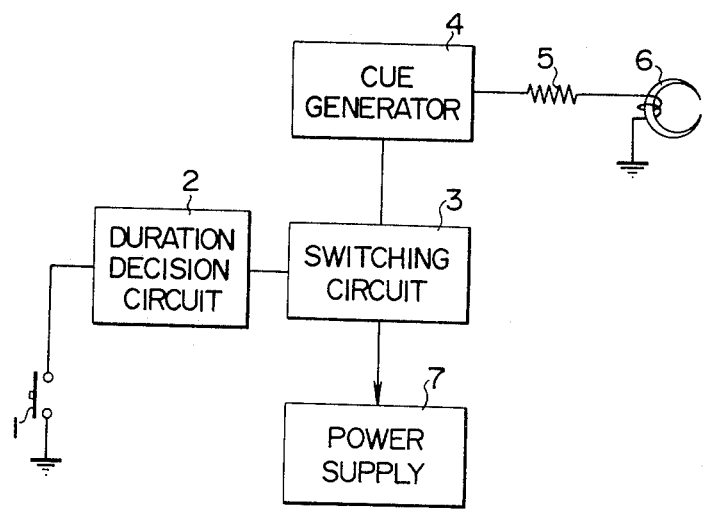
FIG. 1 is a block diagram of an electrical circuit which represents the cue recording system for magnetic recorder according to the invention.

Referring to FIG. 1, there is shown a pushbutton switch 1 which is provided for recording a cue signal. The switch 1 comprises a normally open pushbutton switch, and is connected with a duration decision circuit 2, which is activated when the pushbutton is depressed to close the switch 1. The decision circuit 2 comprises a one-shot multivibrator. As is well recognized, a one-shot multivibrator has a stable state and another astable state, to which the circuit is triggered in response to an input signal. After a time interval determined by circuit parameters of the multivibrator, it automatically reverts to the stable state. The time duration during which the circuit 2 assumes its astable state determines the duration of a cue signal being produced.

When the duration decision circuit 2 is activated, an output thereof renders a transistor switching circuit 3 conductive, thereby connecting a cue generator 4 with a power supply 7 for actuating the cue generator. The cue generator 4 comprises an oscillator circuit formed of a flipflop circuit of a known form, an oscillation output of which is fed through a resistor 5 as a cue signal to a magnetic head 6, which records it on a magnetic tape, not shown.

In operation, as the pushbutton is depressed to close the switch 1, the circuit 2 is activated, whereby the cue generator 4 is set in operation, producing a cue signal. After a given time duration has passed, the circuit 2 automatically reverts to its stable state, interrupting the connection of the cue generator 4 with the power supply 7 and thus deactuating the operation thereof. Thus, a cue signal of a given time duration is magnetically recorded on a magnetic tape.

Figure 2:
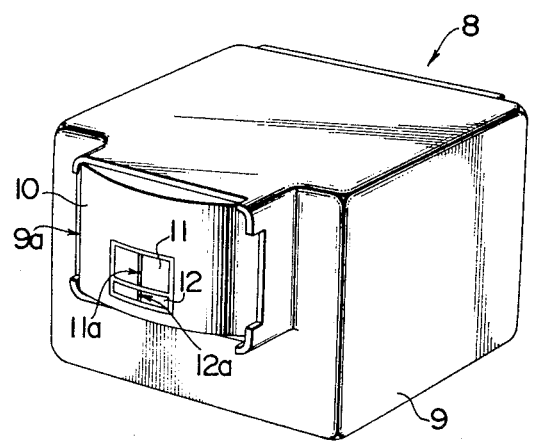
FIG. 2 is a perspective view of a composite magnetic heat which includes a cue record/playback function.
Figure 3:
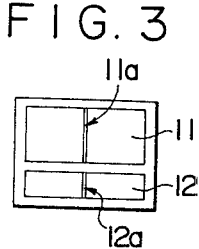
FIG. 3 is an enlarged front view of a portion of the magnetic head shown in FIG. 2.

FIG. 2 shows an example of magnetic head 8 which may be used to record and reproduce a cue signal onto or from a magnetic tape. The head 8 is formed with a cue record/playback gap in addition to the gap which is used for recording and reproducing an acoustic signal to be recorded. Specifically, the head comprises a shield case 9 having a window 9a formed in its front surface and in which a non-magnetic holder 10 carrying a pair of cores 11, 12 is internally housed. The cores 11, 12 are disposed in vertically aligned manner in the lower portion of the window 9a, and have their gaps 11a, 12a exposed through the window 9a. The gap 11a has a width which is greater than that of the gap 12a, and is used for recording and reproducing an acoustic signal while the gap 12a is used for recording and reproducing a cue signal (see FIG. 3). While not shown, coils are disposed on both cores 11, 12 within the shield case 9.

Figure 4:
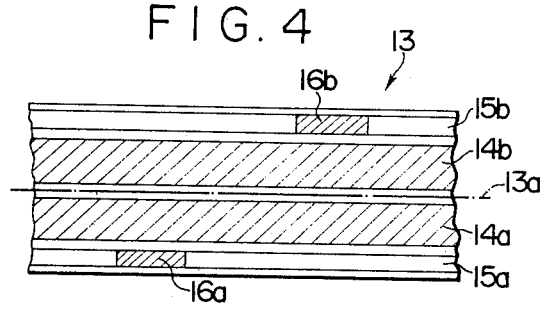
FIG. 4 is a fragmentary plan view of the magnetic tape, showing tracks on which a magnetic recording is made by the head shown in FIGS. 2 and 3.

FIG. 4 shows a magnetic tape 13 on which a magnetic recording is made by the head 8. As shown, the tape 13 is formed with a pair of tracks 14a, 14b for recording an acoustic signal which are disposed on the opposite sides of a centerline 13a, and a pair of additional tracks 15a, 15b for recording a cue signal, which tracks are further removed from the centerline than the tracks 14a, 14b. During a record/playback operation, the tape is passed in sliding contact with the window 9a of the magnetic head 8 to permit a recording on or playback from the tracks 14a, 15a during its movement in one direction, and then is run in the opposite direction to permit a recording on or playback from the tracks 14b, 15b. A cue signal is supplied to the coil associated with the gap 12a to produce the recordings as shown at 16a, 16b on the tracks 15a, 15b, during a record operation. Such cue signal is detected by the gap 12a during a playback operation, and in response to such detection, the tape 13 is automatically fed at a uniform rate. In this manner, the head 8 having a combination of acoustic signal gap 11a and cue gap 12a which are located in a sophisticated manner avoids a loss of both signals while providing an automatic control of the tape running.

Figure 5:
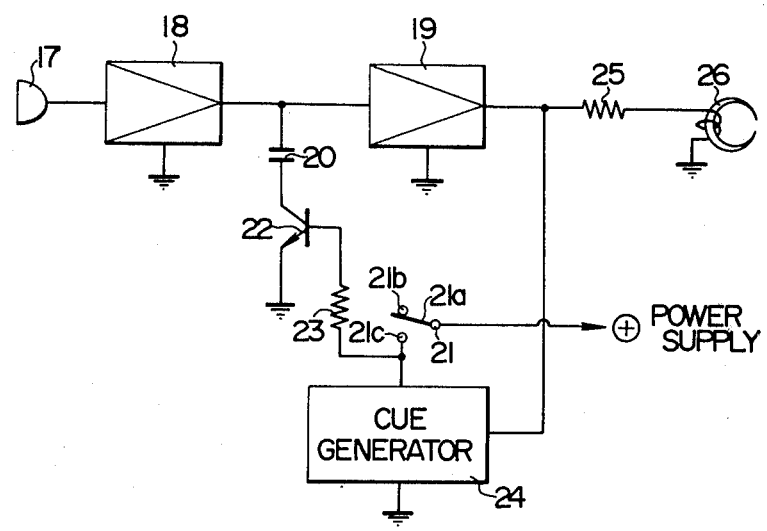
FIG. 5 is a circuit diagram of another embodiment of the invention in which a cue signal is serially recorded with an acoustic signal on a single track.

FIG. 5 shows another embodiment of the invention in which an acoustic signal and a cue signal are serially recoded on one track of a magnetic tape. Referring to FIG. 5, an acoustic signal from a microphone 17 is fed to a first amplifier 18 and thence to a second amplifier 19. After a suitable amplification, the acoustic signal is fed through a resistor 25 to be applied to a recording head 26 so as to be recorded on a given track on a magnetic tape, not shown. A cue generator 24 produces a cue signal, which is also fed through the resistor 25 to be applied to the head 26 so as to be recorded on the same track as the acoustic signal.

The cue generator 24 comprises an oscillator circuit formed of a flipflop of a known form, for example, and is energized through a pushbutton switch 21. As a pushbutton (not shown) which is provided for recording a cue signal is depressed, a movable contact of the switch 21 which is connected with the positive terminal of a power supply is changed from one stationary contact 21b to the other stationary contact 21c, through which the cue generator 24 is energized. Since the switch 21 is formed as a pushbutton switch, the connection between the movable contact 21a and the stationary contact 21c is completed only during the time the pushbutton is depressed, and if the pushbutton is released, the movable contact 21a automatically returns into contact with the stationary contact 21b. Thus, the cue signal is produced from the cue generator 24 only for a time interval during which the pushbutton is held depressed.

A record input circuit is formed by the microphone 17 and the first amplifier 18, the output of which is connected through a capacitor 20 with a collector of a transistor 22 having its emitter connected with the ground and its base connected through a resistor 23 with the stationary contact 21c. The transistor 22 functions to short-circuit the acoustic input to the ground. When it is desired to record a cue signal on a magnetic tape, the pushbutton is depressed, whereby the cue generator 24 is energized by the power supply, feeding a cue signal through the resistor 25 to the head 26 for purpose of recording it. The supply voltage is also applied to the base of the transistor 22 through the resistor 23, whereby the transistor is rendered conductive, completing a short-circuit path from the output of the first amplifier 18 to the ground, thus preventing the acoustic signal from the microphone 17 from being passed to the second amplifier 19. In this manner, a recording of the acoustic signal is prevented while the cue signal is being recorded.

When the pushbutton is released, the switch 21 resumes the position in which the movable contact 21a is connected with the stationary contact 21b, thus deenergizing the cue generator 24 and rendering the transistor 22 non-conductive. Thus, the acoustic signal can be fed through the first and second amplifiers 18, 19 to be supplied to the head 26 for recording it on the same track as the cue signal.

Figure 6:
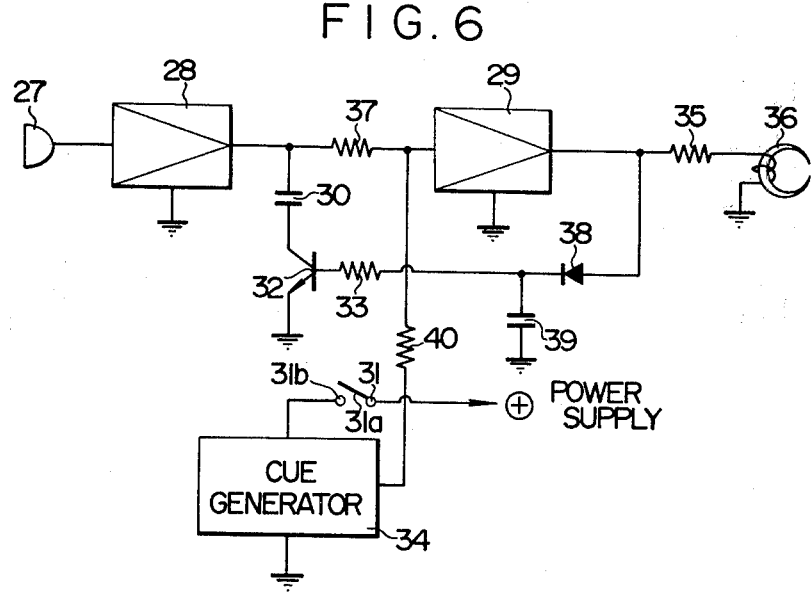
FIG. 6 is a circuit diagram of a further embodiment of the invention in which a cue signal is serially recorded with an acoustic signal.

FIG. 6 shows a further embodiment of the invention in which the acoustic signal and the cue signal are also serially recorded on the same track of a magnetic tape. Referring to FIG. 6, an acoustic signal from a microphone 27 is fed to a first amplifier 28 and thence fed through a resistor 37 to a second amplifier 29. As before, the amplifier acoustic signal is fed through a resistor 35 to be applied to a magnetic head 36 for recording it on a given track of a magnetic tape, not shown. The recording circuit shown is provided with an AGC circuit. Specifically, the output of the first amplifier 28 is connected through a capacitor 30 with the collector of an AGC transistor 32, which has its emitter connected with the ground and its base connected through a series combination of a resistor 33 and a diode 38 to the output of the second amplifier 29. A shunt capacitor 39 is connected from the junction between the diode 38 and resistor 33 to the ground. A negative feedback from the output of the second amplifier 29 to the base of the transistor 32 permits the transistor to control an input to the second amplifier 29 automatically so that an acoustic signal of a constant magnitude is obtained at the output of the second amplifier 29.

In accordance with the invention, the AGC transistor 32 may be used as a short-circuiting transistor mentioned above in connection with FIG. 5. There is provided a cue generator 34 which is adapted to be energized by a power supply through a switch 31. A cue signal produced is applied to the input of the second amplifier 29. As before, the cue generator 34 is formed as an oscillator comprising a flipflop circuit. The switch has a movable contact 31a connected with the positive terminal of a power supply and which may be thrown to its stationary contact 31b when a pushbutton (not shown), which is provided for recording a cue signal, is depressed.

In operation, when it is desired to record a cue signal on a magnetic tape, the pushbutton may be depressed to close the switch 31. Thereupon, the cue generator 34 is energized and produces a cue signal, which is applied to the input of the second amplifier 29. After amplification in the amplifier 29, the cue signal is passed through the resistor 35 to be applied to the head 36 for recording it on a given track of the tape. Part of the cue signal amplified by the amplifier 29 is fed back through the diode 38 and resistor 33 to the base of the AGC transistor 32, rendering it conductive. As the transistor conducts, any acoustic signal which may be applied from the microphone 27 and amplified by the first amplifier 28 is bypassed to the ground through the capacitor 30 and the transistor 32, removing any acoustic input to the second amplifier 29. In this manner, the application of the acoustic signal to the magnetic head is avoided for a time interval during which the cue signal is being recorded, thus eliminating a concurrent recording of any other signal than the cue signal on the track. In this manner, the AGC transistor used in the recording circuit is advantageously utilized to bypass the acoustic signal from a microphone to the ground when the cue signal is being recorded.

What is claimed is:

1. A cue recording system for magnetic recorders, comprising:
   a microphone;
   a tape head;
   acoustical input circuit means for generating an electrical signal representative of an acoustical signal applied to said microphone;
   means for normally applying said electrical signal to said tape head;
   cue generating circuit means for applying a cue signal to said tape head while said acoustical input circuit generates said electrical signal and for preventing said electrical signal from being applied to said tape head when said cue signal is applied to said tape head so that only said cue signal is applied to said tape head.

2. The cue recording system of claim 1, wherein said cue generating circuit means comprises:
   a transistor coupled to said acoustical input circuit in such a manner that said electrical signal is shunted from said tape head when said transistor is on; and
   means for turning said transistor on when said cue signal is applied to said tape head.

3. A cue recording system for magnetic recorders, comprising:
   a microphone;
   a tape head;
   acoustical input circuit means for generating an electric signal representative of an acoustical signal applied to said microphone;
   an AGC circuit means including an AGC transistor for adjusting the gain of said electrical signal and for applying said adjusted electrical signal to said tape head;
   cue generating circuit means for applying a cue signal to said tape head while said acoustical input signal is being generated and for causing said AGC transistor to shunt said electrical signal from said tape head when said cue signal is applied to said tape head so that only said cue signal is applied to said tape head.

4. The cue recording system of claim 1, wherein said cue generating circuit means comprises:
   a cue signal generator;
   AGC circuit means, including an AGC transistor, for adjusting the gain of said electrical signal and for applying said adjusted electrical signal to said tape head, said AGC transistor being coupled to said acoustical input circuit means in such a manner that said cue signal generated by said cue generator causes said AGC transistor to shunt said electrical signal from said tape head when said cue signal is applied to said tape head whereby only said cue signal is applied to said tape head; and
   means for enabling said cue signal generator to generate said cue signal.

* * * * *